(12) United States Patent
Merhav et al.

(10) Patent No.: US 10,380,458 B2
(45) Date of Patent: *Aug. 13, 2019

(54) COLD START MACHINE LEARNING ALGORITHM

(71) Applicant: Microsoft Technology Licensing, LLC, Redmond, WA (US)

(72) Inventors: Uri Merhav, Rehovot (IL); Dan Shacham, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/858,224

(22) Filed: Dec. 29, 2017

(65) Prior Publication Data
US 2018/0121761 A1    May 3, 2018

Related U.S. Application Data

(63) Continuation of application No. 15/154,568, filed on May 13, 2016, now Pat. No. 9,886,651.

(51) Int. Cl.
*G06K 9/62* (2006.01)
*G06N 3/04* (2006.01)

(52) U.S. Cl.
CPC ......... *G06K 9/6265* (2013.01); *G06K 9/6267* (2013.01); *G06K 9/6277* (2013.01); *G06N 3/0454* (2013.01)

(58) Field of Classification Search
CPC ............... G06K 9/6265; G06K 9/6267; G06K 9/00228; G06K 9/00288; G06K 9/00677
See application file for complete search history.

(56) References Cited

U.S. PATENT DOCUMENTS

| 8,694,441 | B1 | 4/2014 | Rothschild et al. |
| 9,384,384 | B1 | 7/2016 | Tyagi |
| 9,471,851 | B1 | 10/2016 | Cao et al. |
| 2007/0258656 | A1 | 11/2007 | Aarabi et al. |

(Continued)

OTHER PUBLICATIONS

"U.S. Appl. No. 15/154,568, Non Final Office Action dated Jun. 23, 2017", 11 pgs.

(Continued)

*Primary Examiner* — Jingge Wu
(74) *Attorney, Agent, or Firm* — Schwegman Lundberg & Woessner, P.A.

(57) ABSTRACT

In an example embodiment, a first plurality of images stored on a computing device is identified, each image having an indication that it depicts a first member of a social networking service. The first plurality of images is used as training data to a first machine learning algorithm to train a first machine learning algorithm model corresponding to the first member, the first machine learning algorithm model corresponding to the first member designed to calculate a member likelihood score for a candidate image. Then a second plurality of images stored on the computing device is obtained. Each image of the second plurality of images is fed to the first machine learning algorithm model corresponding to the first member, obtaining a member likelihood score for each of the second plurality of images. Then, based on the member likelihood scores for the second plurality of images, one or more member images are selected.

20 Claims, 6 Drawing Sheets

(56) References Cited

U.S. PATENT DOCUMENTS

| | | |
|---|---|---|
| 2010/0329544 A1* | 12/2010 | Sabe ................. G06K 9/00288 |
| | | 382/159 |
| 2012/0191502 A1 | 7/2012 | Gross et al. |
| 2013/0018871 A1 | 1/2013 | Mehta et al. |
| 2013/0097093 A1 | 4/2013 | Kolber et al. |
| 2013/0121540 A1 | 5/2013 | Garcia et al. |
| 2014/0122290 A1 | 5/2014 | Mclaughlin |
| 2014/0188997 A1 | 7/2014 | Schneiderman et al. |
| 2014/0201126 A1 | 7/2014 | Zadeh et al. |
| 2014/0301653 A1 | 10/2014 | Murphy-chutorian et al. |
| 2014/0337425 A1 | 11/2014 | Buryak et al. |
| 2015/0242707 A1 | 8/2015 | Wilf et al. |
| 2015/0332087 A1 | 11/2015 | Joshi et al. |
| 2015/0347819 A1 | 12/2015 | Yin et al. |
| 2016/0004904 A1 | 1/2016 | Senechal et al. |
| 2016/0019411 A1 | 1/2016 | Bart et al. |
| 2016/0148222 A1 | 5/2016 | Davar et al. |
| 2016/0171446 A1 | 6/2016 | Gandino-saadein et al. |
| 2016/0188635 A1 | 6/2016 | Shah et al. |
| 2016/0294781 A1 | 10/2016 | Ninan et al. |
| 2016/0318521 A1 | 11/2016 | Nothacker |
| 2017/0109448 A1 | 4/2017 | Adamy et al. |
| 2017/0109615 A1* | 4/2017 | Yatziv .................. G06K 9/6267 |
| 2017/0154212 A1* | 6/2017 | Feris .................. G06K 9/00369 |
| 2017/0169570 A1 | 6/2017 | Vashishtha et al. |
| 2017/0330056 A1 | 11/2017 | Merhav et al. |

OTHER PUBLICATIONS

"U.S. Appl. No. 15/154,568, Notice of Allowance dated Nov. 9, 2017", 11 pgs.

"U.S. Appl. No. 15/154,568, Response filed Sep. 20, 2017 to Non Final Office Action dated Jun. 23, 2017", 13 pgs.

* cited by examiner

COLD START MACHINE LEARNING ALGORITHM

CROSS-REFERENCE TO RELATED APPLICATIONS

This application is a continuation of prior application Ser. No. 15/154,568, filed on May 13, 2016, which is incorporated by reference herein in its entirety.

TECHNICAL FIELD

The present disclosure generally relates to computer technology for solving technical challenges in machine learning. More specifically, the present disclosure relates to handling a cold start machine learning algorithm.

BACKGROUND

The rise of the Internet has increased the use of digital images in which to convey aspects of people. One common use of digital photos is in creating a profile on social networks. More and more commonly, social networks are used to engage in professional, as opposed to personal, communications and research. For example, it is common for certain social network members to create profiles listing their professional accomplishments, in a manner similar to a resume, and to direct, invite, or at least make available to potential employers to visit the social network profile. It is becoming more and more common for the member to place some photos of themselves on such member profiles.

An issue that arises with the use of photos in such a professional capacity is that it can be easy for a member to use a photo on their member profile page that is not of the highest quality, either because the photographic techniques involved in taking the photo were not of the highest quality (e.g., bad lighting, poor framing of the subject, poor shading, etc.), or because the subject matter itself was lacking in some regard (e.g., the angle of the head is unusual, the clothes worn are too casual, the background scene is too casual, etc.). These problems are often caused by the fact that many digital photos are now taken using non-professional camera equipment (e.g., a smartphone) by non-professionals (e.g., the member taking a selfie, or a friend taking a quick shot). While certain technical details of a photograph can be quantified to identify the "image quality," it is difficult to extend the image quality to the somewhat more nebulous idea of "professionalism" of the image.

Even assuming that the professionalism of an image can be quantified (which would then allow an image to be selected or modified to maximize this professionalism metric), another issue arises in that it may not be apparent which of a number of different potential photos available on an electronic device of the member (e.g., smartphone) are actually of the member him or herself, as opposed to others. While the member could certainly select particular photos that represent him or herself and inform the system of these selections, this calls for effort on the part of the member that the member may not wish to spend. Since members may be somewhat reluctant to share photos of themselves to begin with, it would be beneficial to have a system that scanned the member's device and retrieved candidate photos that depict the member. This is technically challenging, however, because most photos are not identified as being or not being of a particular person.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
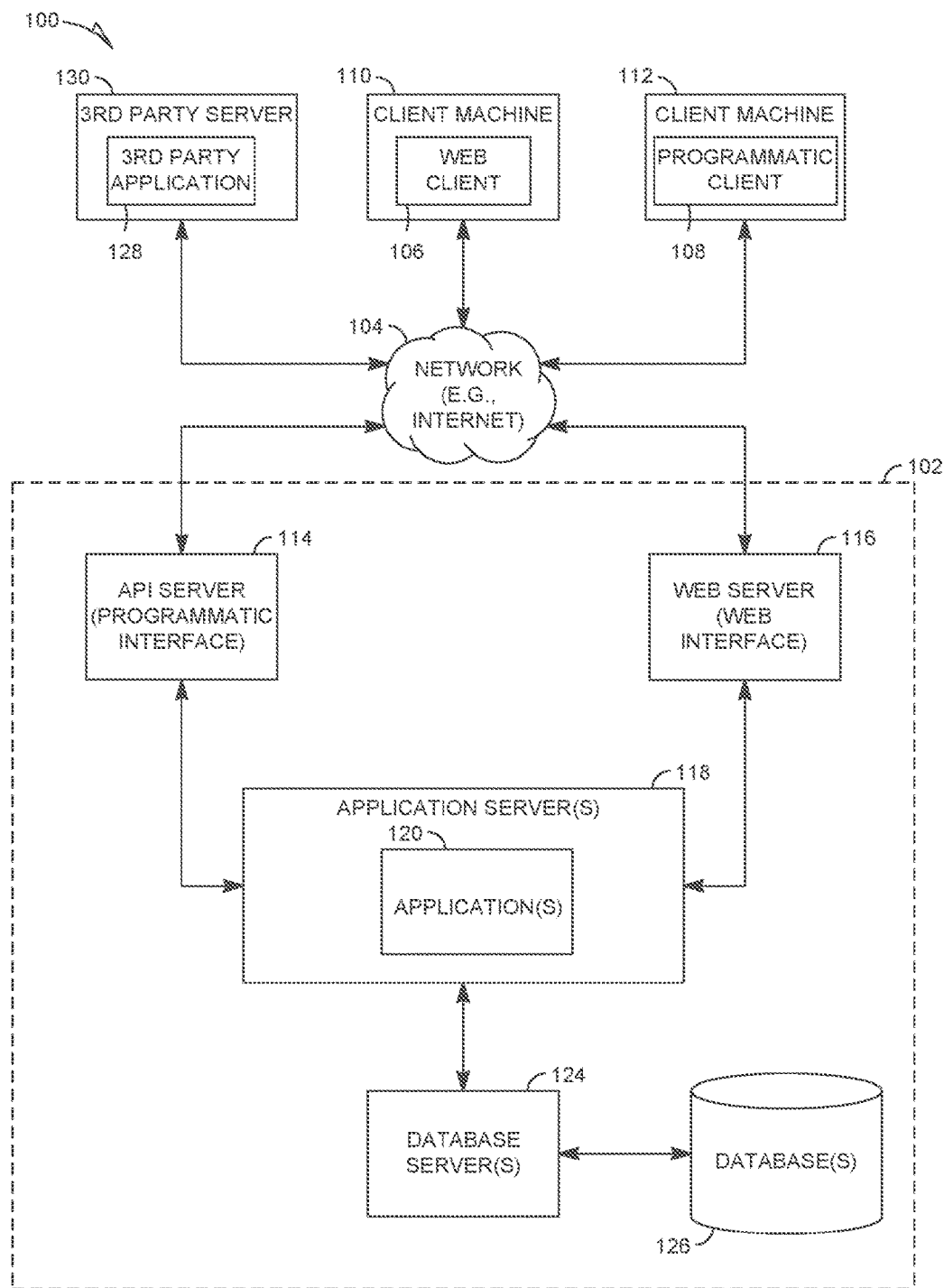
FIG. 1 is a block diagram illustrating a client-server system, in accordance with an example embodiment.

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a machine learning algorithm is used to determine which of a plurality of photos available on a member's device are of the member themself. As will be described in more detail below, one key technical challenge in creating and using such a machine learning algorithm is that there likely is no historical information available the machine learning algorithm to begin to learn which images are of the member. In supervised machine learning algorithms, a model is trained using training data, typically labeled training data, that informs the supervised machine learning algorithm as to what positive and negative results are. In unsupervised machine learning algorithms, a set of features is derived over time. In one example, the machine learning algorithm may be trained to be able to distinguish faces in input candidate images from faces in vectors in feature spaces. These feature spaces are typically, for example, example pictures of a particular user to "match" No matter which type of machine learning algorithm is used, however, the accuracy of the model in predicting which photos are of the member is low until there is sufficient enough information in these vectors in feature spaces to be used by the trained machine learning algorithm. This is known as a "cold start" problem, in that, like an old-fashioned automobile engine, the machine learning algorithm does not run well when initially started for new users.

In order to solve this cold start problem, in an example embodiment an initial set of member photos is identified as being of the user via non-machine learning mechanisms. Specifically, a location of photos may be used to deduce that the photos are of the member. In an example embodiment, this location may be a folder on the member's device titled "selfies" or the like. Selfies are photographs taken of a user by the user, typically using a front-facing camera on a mobile device. The photos stored in this folder can then be used to form feature vectors so that a first machine learning algorithm model can learn what the member looks like. The model is then able to, when presented with a new candidate photo, output a score indicating the likelihood that the photo contains an image of the member. Photos that have a high score (e.g., higher than a preset threshold) can then be used as input to a second machine leaning algorithm that acts to score the professionalism of the photo. This professionalism score can then be used to discard photos of low professionalism and/or edit photos to improve professionalism. The result may be one or more photos of the member that are considered to be high professionalism.

While it might be tempting to simply use the photos in the "selfies" folder as input to the second machine learning algorithm, as these photos have a high likelihood of being of the member themself, selfies are traditionally of lower professionalism to begin with due to the inherent nature of taking a picture of oneself. Lighting, angle, framing, and other technical features of the image are typically of lower quality in a selfie, and additionally there is a higher likelihood of unprofessional attire, hairstyles, facial expressions, etc. As such, in an example embodiment, rather than use the photos in the selfies folder directly as input to the second machine learning algorithm, the photos in the selfies folder are used as training data for the first machine learning algorithm to train a member identification model that outputs a score indicating the likelihood that a given photo is of the member. This model is unique to the member, and would therefore differ for other members. Then, all of the photos on the member's device may be scanned and fed to this model to be scored. The photos, which would include photos located outside the selfies folder, having the highest scores could then be used as candidate photos for the second machine learning algorithm.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112, and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
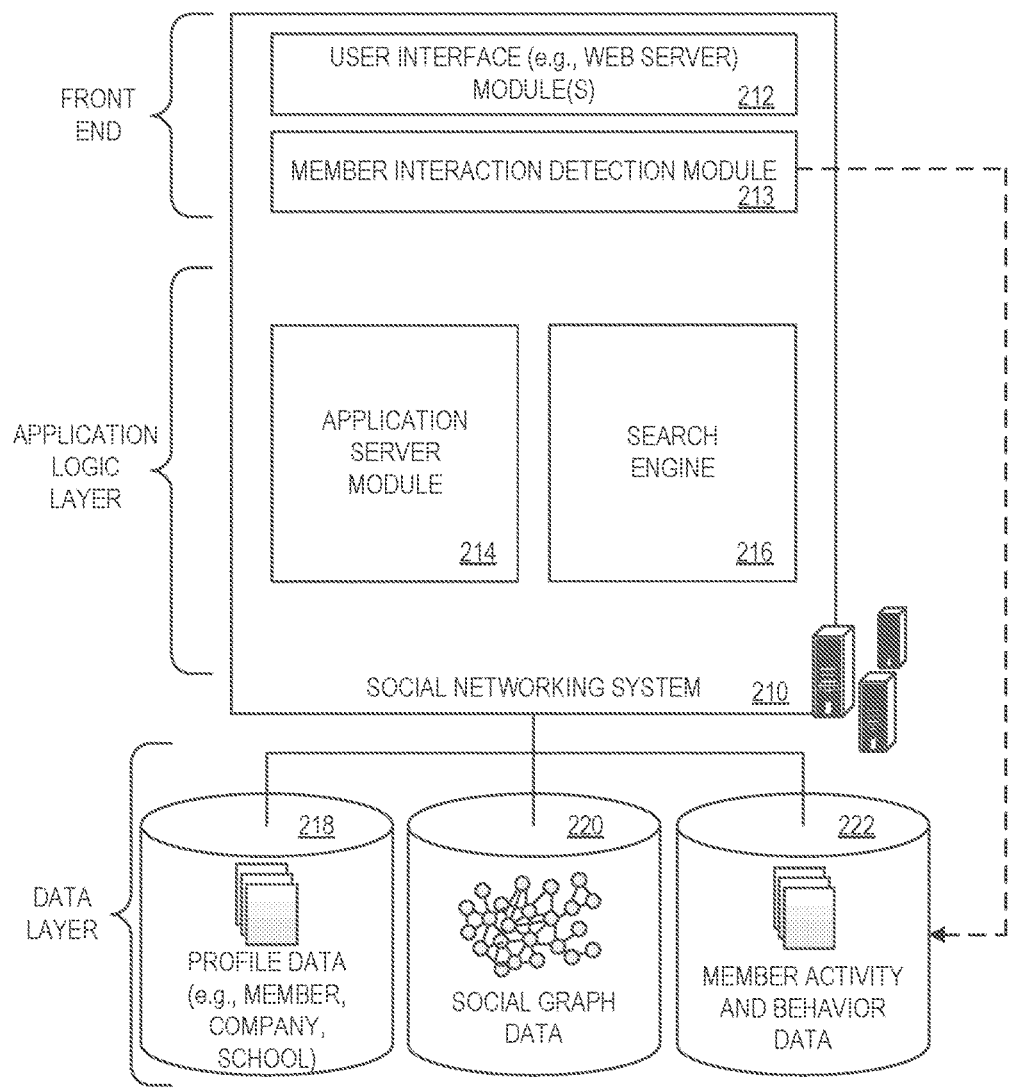
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
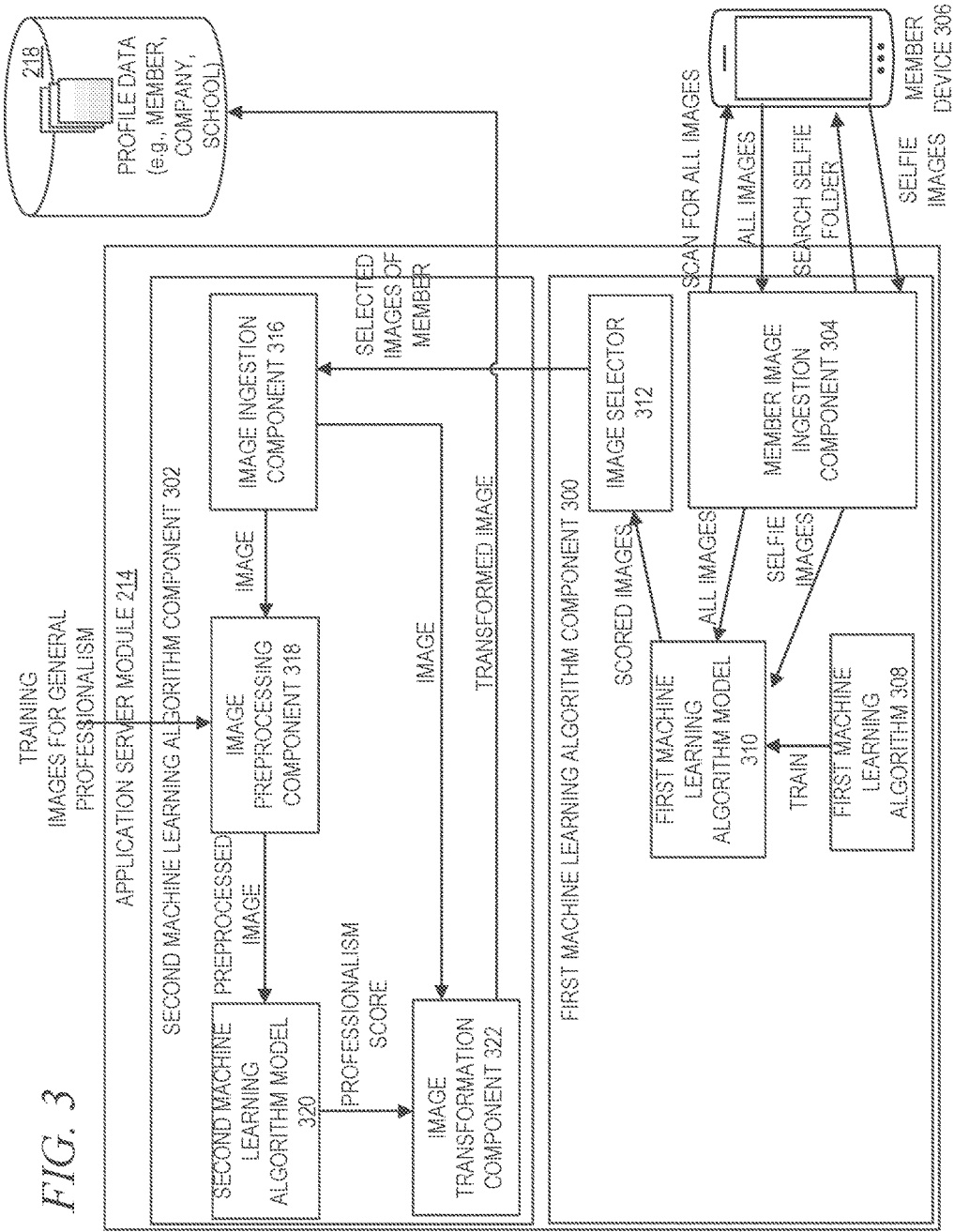
FIG. 3 is a block diagram illustrating the application server module of FIG. 2 in more detail.

FIG. 3 is a block diagram illustrating application server module 214 of FIG. 2 in more detail. While in many embodiments the application server module 214 will contain many subcomponents used to perform various different actions within the social networking system 210, in FIG. 3 only those components that are relevant to the present disclosure are depicted. As described earlier, two different machine learning algorithms may be used. The first is used to train a model to score images based on the likelihood that each image is of the individual member being examined. The second is used to train a model to score the professionalism of an image. As such, a first machine learning algorithm component 300 and a second machine learning algorithm component 302 are provided to implement and use the first and second machine learning algorithms, respectively.

The first machine learning algorithm component 300 contains a member image ingestion component 304. The member image ingestion component 304 acts to request and obtain images of a member from an outside source. In an example embodiment, this outside source is member device 306, which may be, for example, a mobile device such as a smartphone. In alternative embodiments, the member device 306 may be other types of consumer devices, such as tablet computers, smart watches, laptop computers, desktop computers, gaming devices, etc. It is also possible that the member image ingestion component 304 obtains images from multiple different types of consumer devices for the same member, as well as accesses non-member device sources such as databases, websites, etc.; however, for simplicity, the discussion for FIG. 3 will focus on a single member device 306.

At a first stage, the member image ingestion component 304 looks specifically for selfies on the member device 306. It may accomplish this in a number of different ways. As described earlier, one way is to search for any images contained in a folder labeled "selfies" or the like (e.g., "self-portraits," "images of me", etc.). Other embodiments are foreseen where other mechanisms are used to identify selfies, such as metadata tags included in the images and/or advanced image analysis (e.g., analysing lighting and angles from images to identify that an image is a selfie). Separately, a first machine learning algorithm trains 308 is used to train a first machine learning algorithm model 310 to score images based on the likelihood that a member represented in input feature vectors is depicted in input candidate images. The member image ingestion component 304 obtains the selfie images and uses them as the feature vectors input to the first machine learning algorithm model 310.

In an example embodiment, the first machine learning algorithm 308 is a supervised machine learning algorithm. Example supervised algorithms include Linear Support Vector Machine (SVM), Radial Basis Function (RBF) SVM, Decision Tree, Random Forest, AdaBoost, and Naïve Bayes. Different classifiers can also be used, such as k-nearest neighbor, linear SVM classifier (SVC), kernel approximation, Stochastic Gradient Descent (SGD) classifier, and Naïve Bayes. Alternatively, the first machine learning algorithm 308 may be an unsupervised machine learning algorithm Examples of unsupervised learning algorithms include expectation-maximization algorithms, vector quantization, and information bottleneck method. In an example embodiment, a multi-class logistical regression model is used.

Once the first machine learning algorithm model 310 has been trained, the member image ingestion component 304 can obtain additional images from the member device 306 that have not been identified as selfies. In an example embodiment, this may be accomplished by scanning the member device 306 for all images. Each of these obtained images may then be passed through the first machine learning algorithm model 310, along with the feature vectors from the images in the selfie folder, to be scored. This score, which may be termed the "member likelihood score", is an indication of how likely the image in question depicts the member depicted in the feature vectors from the images in the selfie folder. The scored images may be sent to an image selector 312, which acts to select higher scoring images to be sent to the second machine learning algorithm component 302. The mechanism by which the image selector 312 selects such images may vary based on implementation. In one example embodiment, the image selector 312 compares each image's member likelihood score to a preset threshold, and if the member likelihood score transgresses the preset threshold, the corresponding image is sent to the second machine learning algorithm component 302. In another example embodiment, the image selector 312 ranks the scored images by member likelihood score and selects the top n highest ranked images to send to the second machine learning algorithm component 302.

Turning to the second machine learning algorithm component 302, an image ingestion component 316 obtains images from the image selector 312. It should be noted, however, that the image selector 312 can optionally also obtain images from other sources, for example, images uploaded by members to their own member profiles and stored in profile database 218. In some example embodiments, the image ingestion component 316 may obtain the images directly from the member via a user interface, rather than the images being first stored in the profile database 218.

An image preprocessing component 318 takes each image from the image ingestion component 316 and preprocesses it. This may include normalizing certain aspects (such as aspect ratio, length, width, color channels, etc.) of the image. Each preprocessed image is then passed to a second machine learning algorithm model 320, which has been trained using training images to analyze the preprocessed image and produce a professionalism score that indicates a level of professionalism in the content of the image. This professionalism score will then be used by an image transformation component 322 to transform some aspect of the image, such as cropping, rotation, lighting, shading, sharpness, and the like based on the professionalism score to improve the professionalism of the subject of the image. This will also be described in more detail below. The transformed image may then be stored in the profile database 218.

In an example embodiment, the second machine learning algorithm model 320 may be a deep convolutional neural network (DCNN), which is a machine-learning model that effectively infers non-linear relationships between a homogeneous input field and desired outputs, which are either categorical classes or scalars. The DCNN is a model that maps inputs to outputs using a sequence of so-called convolutional layers of artificial neurons. The DCNN may be trained by presenting it with a large number (e.g., greater than 10,000) of sample images and labels (e.g., "professional" or "not professional") or scores (e.g., professionalism score of 76/100) associated with the sample images. It is trained to minimize the discrepancy (or "loss") between the model's output and the desired output. After the training, the model may be applied to new input images to produce a useful prediction of the professionalism levels of the new input images.

The DCNN performs better when the input images have been normalized, and so a preprocessing operation may be performed by the image preprocessing component 318 on both the sample images and the input images to normalize them. This normalization may include, for example, altering all images to be of a consistent size (e.g., 250×250 pixels) and of consistent color channels (e.g., 3 color channels of red-green-blue). The DCNN also performs better when the inputs are homogenous, meaning that the inputs have a uniform meaning (e.g., each pixel represents intensity), and neighborhood relationships in the input are well defined (e.g., pixels adjacent to each other represent physically close locations).

The DCNN is designed to learn not only classifications/ professionalism scores for images, but also to learn the feature hierarchy, all the ways from pixels to classifier, by defining a number of layers. The process of inference involves taking a given input, applying a sequence of mathematical functions called layers, and calculating the functions on the input images. Each layer extracts features from the output of a previous layer, and all layers are trained jointly. The layer-based architecture is why it is termed a "deep" convolutional neural network, it should be noted that in some example embodiments, the first machine learning algorithm model 310 may also be a DCNN.

Figure 4:
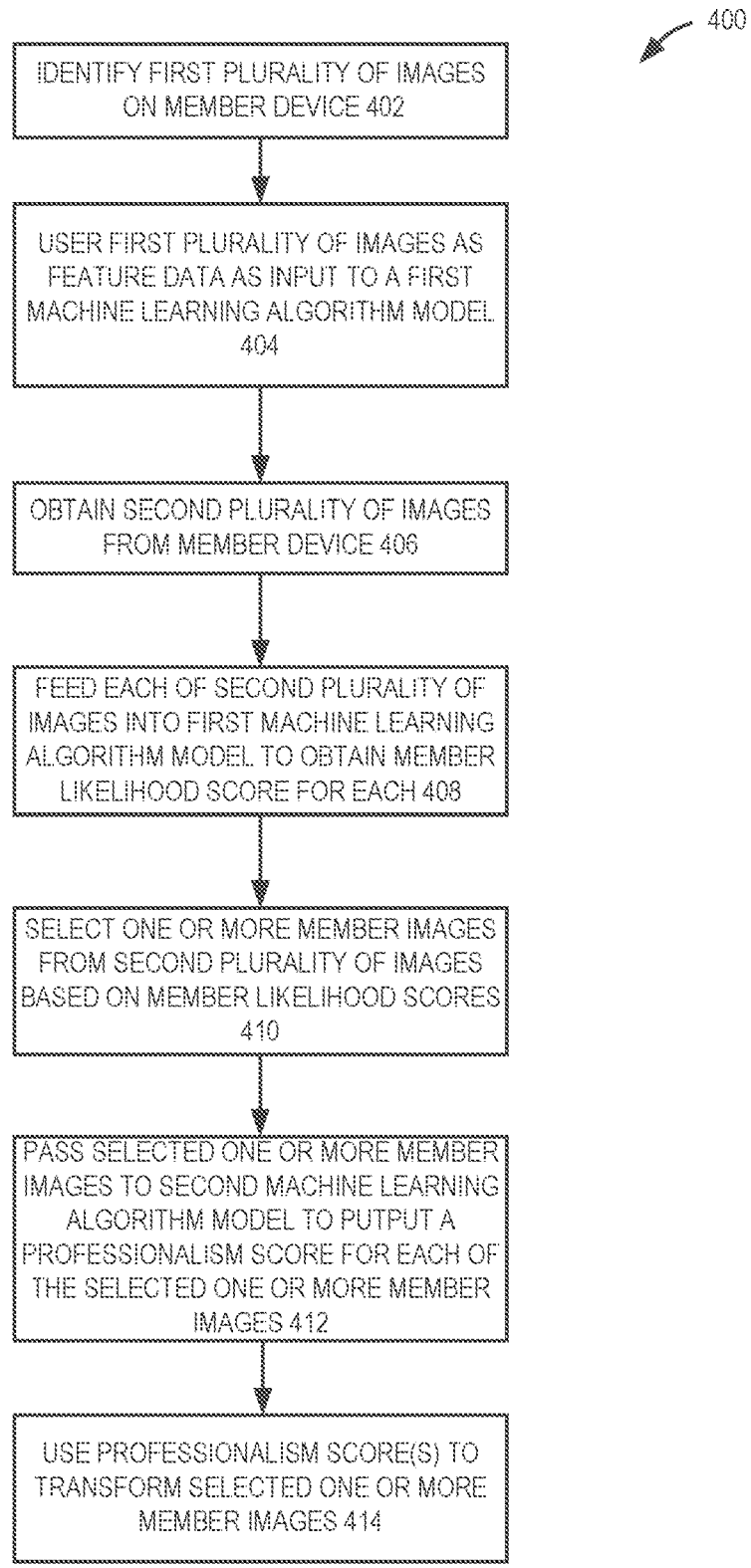
FIG. 4 is a flow diagram illustrating a method of selecting and transforming images from a member device for use as a profile image on a profile of the member on a social networking service in accordance with an example embodiment.

FIG. 4 is a flow diagram illustrating a method 400 of selecting and transforming images from a member device for use as a profile image on a profile of the member on a social networking service in accordance with an example embodiment. At operation 402, a first plurality of images stored on the member device are identified. Each of these first plurality of images may have an indication that they depict the member. This indication may be, for example, the fact that each of the first plurality of images is stored in a folder labeled in a manner suggesting that they depict the member (e.g., "selfies").

At operation 404, the first plurality of images is used as feature data as input to a first machine learning algorithm model. The first machine learning algorithm model is designed to calculate a member likelihood score for a candidate image, based on the feature data. The member likelihood score is a measurement of a likelihood that the candidate image depicts the member.

At operation 406, a second plurality of images is obtained from the member device. At least some of the second plurality of images do not have the indication that they depict the first member. For example, at least some of the images in the second plurality of images may not be stored in a folder labeled in a manner suggesting the content depicts the member, such as "selfies."

At operation 408, each of the second plurality of images is fed into the first machine learning algorithm model to obtain a member likelihood score for each of the second plurality of images. At operation 410, based on the member likelihood scores for the second plurality of images, one or more member images may be selected from the second plurality of images. This may be performed by, for example, selecting the top scoring n images in the second plurality of images, or alternatively selecting any of the second plurality of images having member likelihood scores transgressing a preset threshold.

At operation 412, the selected one or more member images are passed to a second machine learning algorithm model, the second machine learning algorithm model trained to output a professionalism score for each image passed to it. At operation 414, the professionalism score of at least one of the selected one or more member images is used to perform a transformation of the at least one of the selected one or more member images to improve the professionalism score. This transformation may include, for example, cropping, lighting transformations, angle transformations, sharpness transformations, etc.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-4 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 5:
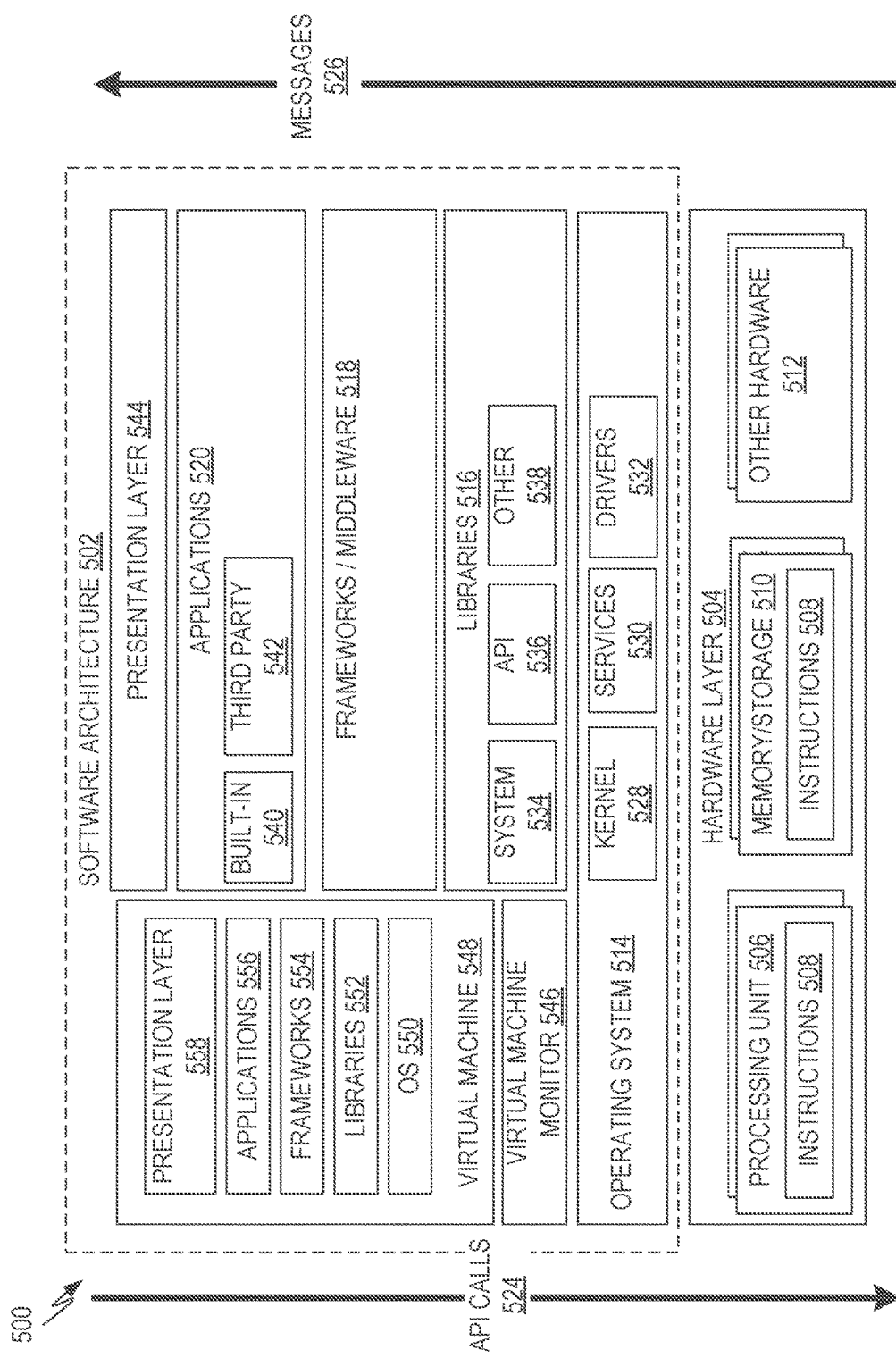
FIG. 5 is a block diagram illustrating a representative software architecture, which may be used in conjunction with various hardware architectures herein described.

FIG. 5 is a block diagram 500 illustrating a representative software architecture 502, which may be used in conjunction with various hardware architectures herein described. FIG. 5 is merely a non-limiting example of a software architecture, and it will be appreciated that many other architectures may be implemented to facilitate the functionality described herein. The software architecture 502 may be executing on hardware such as a machine 600 of FIG. 6 that includes, among other things, processors 610, memory/storage 630, and I/O components 650. A representative hardware layer 504 is illustrated and can represent, for example, the machine 600 of FIG. 6. The representative hardware layer 504 comprises one or more processing units 506 having associated executable instructions 508. The executable instructions 508 represent the executable instructions of the software architecture 502, including implementation of the methods, modules, and so forth of FIGS. 1-4. The hardware layer 504 also includes memory and/or storage modules 510, which also have the executable instructions 508. The hardware layer 504 may also comprise other hardware 512, which represents any other hardware of the hardware layer 504, such as the other hardware illustrated as part of the machine 600.

In the example architecture of FIG. 5, the software architecture 502 may be conceptualized as a stack of layers where each layer provides particular functionality. For example, the software architecture 502 may include layers such as an operating system 514, libraries 516, frameworks/middleware 518, applications 520, and a presentation layer 544. Operationally, the applications 520 and/or other components within the layers may invoke API calls 524 through the software stack and receive responses, returned values, and so forth, illustrated as messages 526, in response to the API calls 524. The layers illustrated are representative in nature and not all software architectures have all layers. For example, some mobile or special purpose operating systems may not provide a layer of frameworks/middleware 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 516 may provide a common infrastructure that may be utilized by the applications 520 and/or other components and/or layers. The libraries 516 typically provide functionality that allows other software modules to perform tasks in an easier fashion than by interfacing directly with the underlying operating system 514 functionality (e.g., kernel 528, services 530, and/or drivers 532). The libraries 516 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks 518 (also sometimes referred to as middleware) may provide a higher-level common infrastructure that may be utilized by the applications 520 and/or other software components/modules. For example, the frameworks 518 may provide various graphic user interface (GUI)

functions, high-level resource management, high-level location services, and so forth. The frameworks 518 may provide a broad spectrum of other APIs that may be utilized by the applications 520 and/or other software components/modules, some of which may be specific to a particular operating system or platform.

The applications 520 include built-in applications 540 and/or third party applications 542. Examples of representative built-in applications 540 may include, but are not limited to, a contacts application, a browser application, a book reader application, a location application, a media application, a messaging application, and/or a game application. The third party applications 542 may include any of the built-in applications 540 as well as a broad assortment of other applications. In a specific example, the third party application 542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 542 may invoke the API calls 524 provided by the mobile operating system such as the operating system 514 to facilitate functionality described herein.

The applications 520 may utilize built-in operating system 514 functions (e.g., kernel 528, services 530, and/or drivers 532), libraries 516 (e.g., system libraries 534, API libraries 536, and other libraries 538), and frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with a user.

Some software architectures utilize virtual machines. In the example of FIG. 5, this is illustrated by a virtual machine 548. A virtual machine creates a software environment where applications/modules can execute as if they were executing on a hardware machine (such as the machine 600 of FIG. 6, for example) A virtual machine is hosted by a host operating system (e.g., operating system 514 in FIG. 5) and typically, although not always, has a virtual machine monitor 546, which manages the operation of the virtual machine 548 as well as the interface with the host operating system (e.g., operating system 514). A software architecture executes within the virtual machine 548, such as an operating system 550, libraries 552, frameworks/middleware 554, applications 556, and/or a presentation layer 558. These layers of software architecture executing within the virtual machine 548 can be the same as corresponding layers previously described or may be different.

Example Machine Architecture and Machine-Readable Medium

Figure 6:
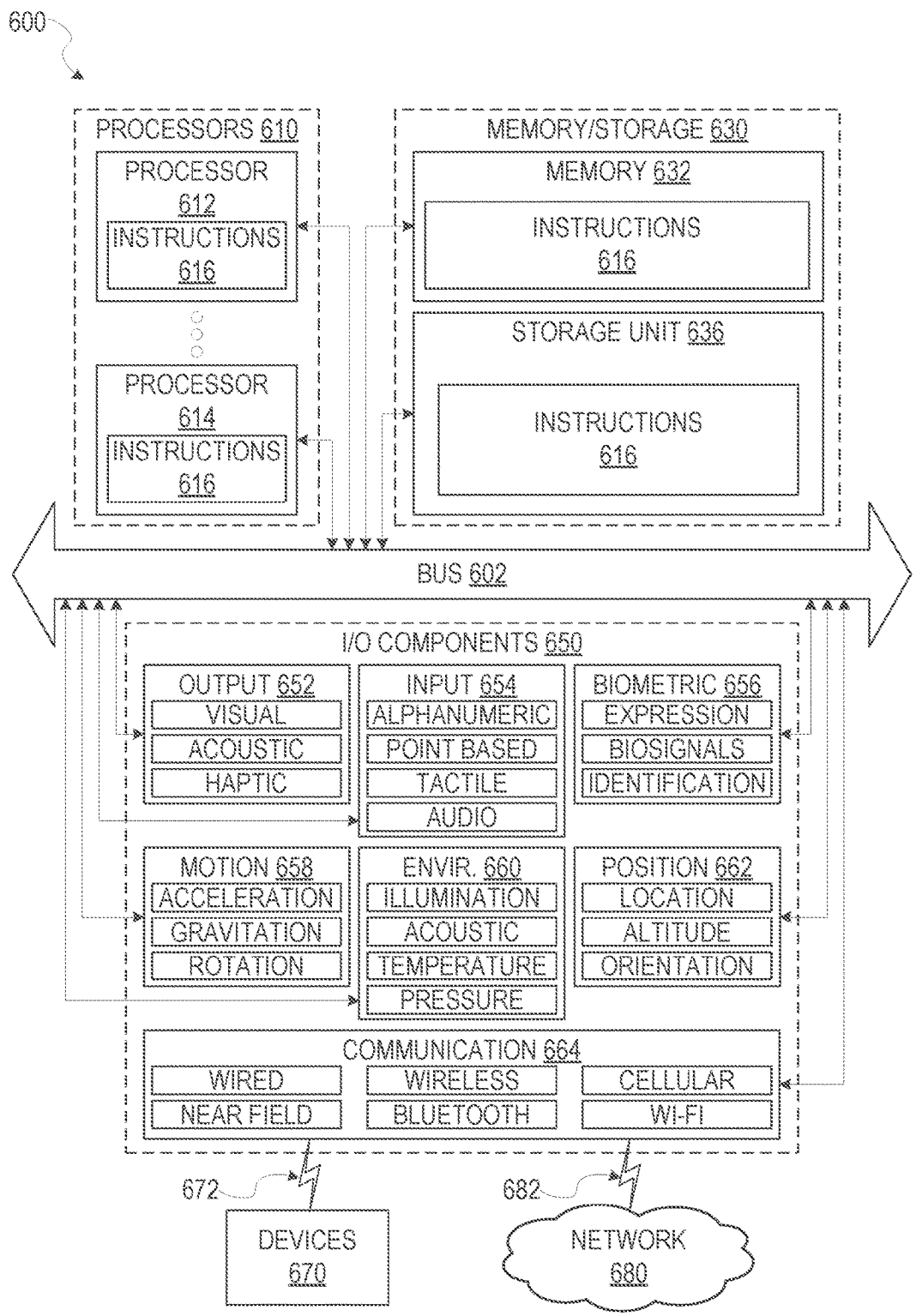
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. The instructions 616 transform the general, non-programmed machine into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory/storage 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store instructions (e.g., instructions 616) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine (e.g., processors 610), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or other suitable device to interface with the network 680. In further examples, the communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a USB).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method of selecting one or more images from a plurality of images, the method comprising:
   obtaining a first plurality of images stored on a computing device; at least some of the first plurality of images not having the indication that they depict the first member;
   feeding each of the first plurality of images to a first machine learning algorithm model unique to a first user, the first machine learning algorithm model trained, using images containing an indication that they depict the first user, to calculate a user likelihood score for a candidate image based on the feature data, the user likelihood score being a measurement of a likelihood that the candidate image depicts the first user; and
   based on the user likelihood scores for the first plurality of images, selecting one or more user images from the first plurality of images.

2. The computerized method of claim 1, further comprising:
   passing the selected one or more member images to a second machine learning algorithm model, the second machine learning algorithm model trained to output a professionalism score for each image passed to it; and
   using the professionalism score of at least one of the selected one or more member images to perform a transformation of the at least one of the selected one or more member images to improve the professionalism score.

3. The computerized method of claim 1, wherein the indication that the first plurality of images depicts the first member is that they are stored in a folder labeled in a manner suggesting that they depict the first member.

4. The computerized method of claim 1, wherein the first machine learning algorithm model is a deep convolutional neural network.

5. The computerized method of claim 2, wherein the second machine learning algorithm model is a deep convolutional neural network.

6. The computerized method of claim 1, wherein the computing device is a mobile device having a front-facing camera.

7. The computerized method of claim 1, wherein the selecting includes selecting any of the second plurality of images having member likelihood scores transgressing a preset threshold.

8. A system comprising:
   one or more processors;
   a non-transitory computer-readable medium having instructions stored thereon, which, when executed by the one or more processors a processor, cause the system to:
   obtain a first plurality of images stored on a computing device, at least some of the first plurality of images not having the indication that they depict the first member;
   feeding each of the first plurality of images to a first machine learning algorithm model unique to a first user, the first machine learning algorithm model trained, using images containing an indication that they depict the first user, to calculate a user likelihood score for a candidate image based on the feature data, the user likelihood score being a measurement of a likelihood that the candidate image depicts the first user; and based on the user likelihood scores for the first plurality of images, select one or more user images from the first plurality of images.

9. The system of claim 8, wherein the instructions further cause the system to:

pass the selected one or more member images to a second machine learning algorithm model, the second machine learning algorithm model trained to output a professionalism score for each image passed to it; and use the professionalism score of at least one of the selected one or more member images to perform a transformation of the at least one of the selected one or more member images to improve the professionalism score.

10. The system of claim 8, wherein the indication that the first plurality of images depicts the first member is that they are stored in a folder labeled in a manner suggesting that they depict the first member.

11. The system of claim 8, wherein the first machine learning algorithm model is a deep convolutional neural network.

12. The system of claim 9, wherein the second machine learning algorithm model is a deep convolutional neural network.

13. The system of claim 8, wherein the computing device is a mobile device having a front-facing camera.

14. The system of claim 13, wherein the selecting includes selecting any of the second plurality of images having member likelihood scores transgressing a preset threshold.

15. A non-transitory machine-readable storage medium comprising instructions, which, when implemented by one or more machines, cause the one or more machines to perform operations comprising:

obtaining a first plurality of images stored on a computing device, at least some of the first plurality of images not having the indication that they depict the first member;

feeding each of the first plurality of images to a first machine learning algorithm model unique to a first user, the first machine learning algorithm model trained, using images containing an indication that they depict the first user, to calculate a user likelihood score for a candidate image based on the feature data, the user likelihood score being a measurement of a likelihood that the candidate image depicts the first user; and based on the user likelihood scores for the first plurality of images, selecting one or more user images from the first plurality of images.

16. The non-transitory machine-readable storage medium of claim 15, further comprising:

passing the selected one or more member images to a second machine learning algorithm model, the second machine learning algorithm model trained to output a professionalism score for each image passed to it; and using the professionalism score of at least one of the selected one or more member images to perform a transformation of the at least one of the selected one or more member images to improve the professionalism score.

17. The non-transitory machine-readable storage medium of claim 15, wherein the indication that the first plurality of images depict the first member is that they are stored in a folder labeled in a manner suggesting that they depict the first member.

18. The non-transitory machine-readable storage medium of claim 15, wherein the first machine learning algorithm model is a deep convolutional neural network.

19. The non-transitory machine-readable storage medium of claim 16, wherein the second machine learning algorithm model is a deep convolutional neural network.

20. The non-transitory machine-readable storage medium of claim 15, wherein the computing device is a mobile device having a front-facing camera.

* * * * *

UNITED STATES PATENT AND TRADEMARK OFFICE
CERTIFICATE OF CORRECTION

PATENT NO. : 10,380,458 B2
APPLICATION NO. : 15/858224
DATED : August 13, 2019
INVENTOR(S) : Merhav et al.

Page 1 of 1

It is certified that error appears in the above-identified patent and that said Letters Patent is hereby corrected as shown below:

In the Claims

In Column 18, Line 15, in Claim 1, delete "device;" and insert --device,-- therefor Signed and Sealed this
Twentieth Day of October, 2020

Andrei Iancu
*Director of the United States Patent and Trademark Office*